Nov. 17, 1925.

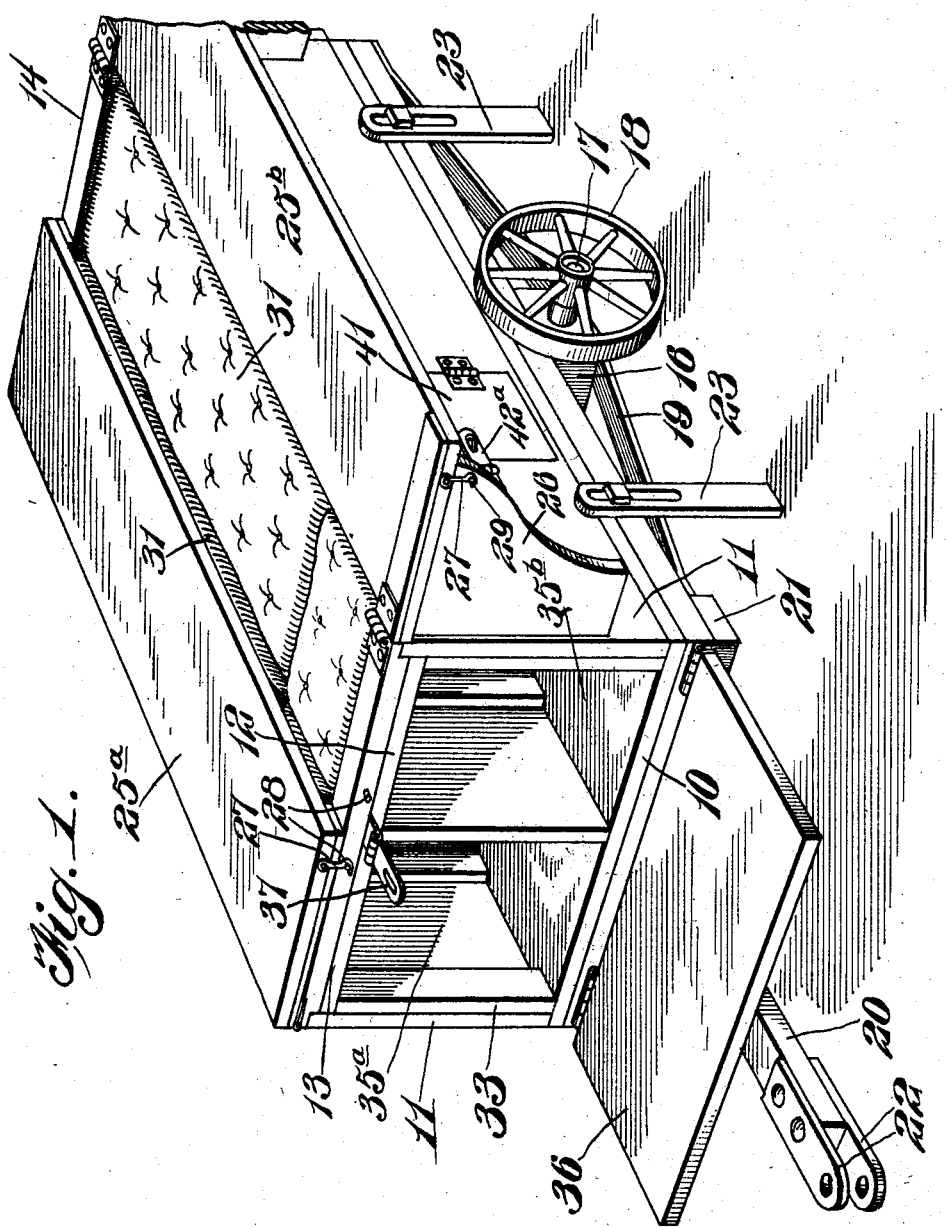

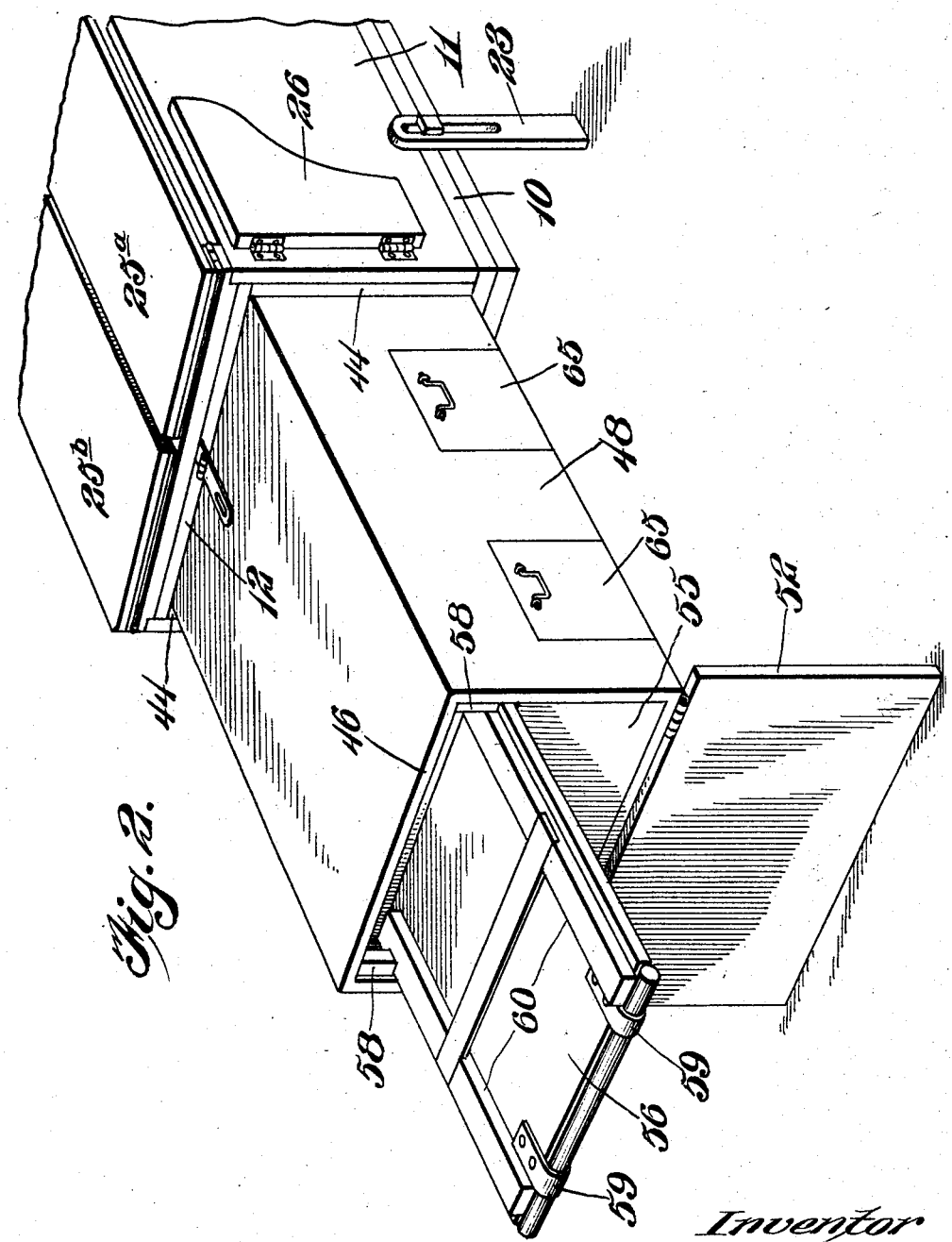

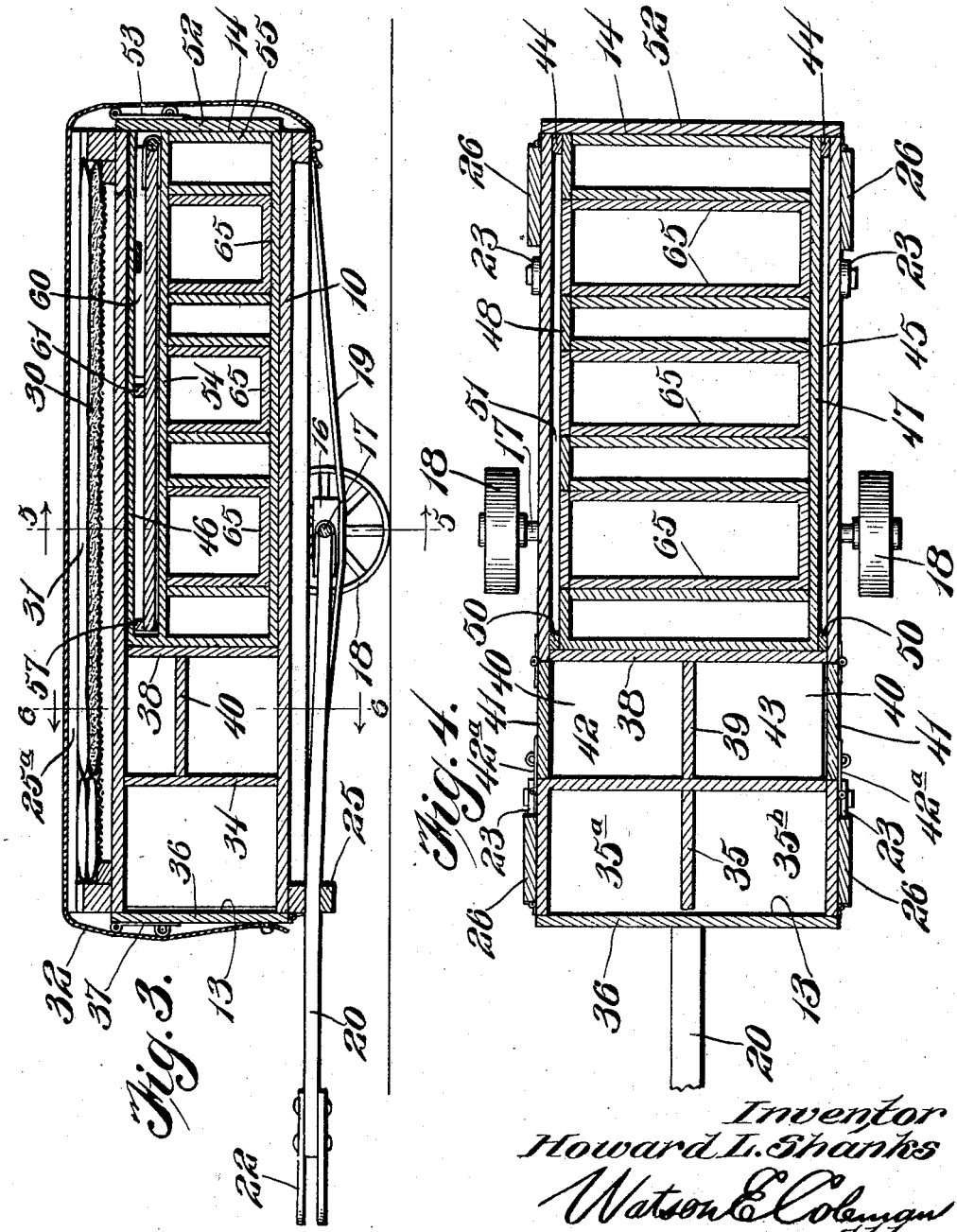

H. L. SHANKS

AUTOMOBILE TRAILER

Filed Jan. 24, 1925

Inventor
Howard L. Shanks
Watson E. Coleman
Atty

Patented Nov. 17, 1925.

1,562,371

UNITED STATES PATENT OFFICE.

HOWARD L. SHANKS, OF MESICK, MICHIGAN.

AUTOMOBILE TRAILER.

Application filed January 24, 1925. Serial No. 4,474.

*To all whom it may concern:*

Be it known that I, HOWARD L. SHANKS, a citizen of the United States, residing at Mesick, in the county of Wexford and State of Michigan, have invented certain new and useful Improvements in Automobile Trailers, of which the following is a specification, reference being had to the accompanying drawings.

This invention relates to automobile trailers and more particularly to a device for the use of automobile tourists and adapted to be attached to the rear of an automobile to be drawn thereby.

An important object of the invention is to provide a compact convenient device of this character including storage space for the necessary equipment of the automobile tourist and providing a sleeping space, tables and other such desirable equipment.

A further and more particular object of the invention is the provision of a plurality of tables for a device of this character, one of which serves for meals and the other serves as a work table for the cleaning of utensils and the like, these tables being so constructed that they are compactly folded and stored within the body of the trailer.

A further object of the invention is to provide in a combination of two such tables with a trailer a construction such that the trailer supports one end of one of the tables while this table serves to support one end of the other of the tables and provides not only a housing for this second table but likewise storage space in the form of drawers for the reception of utensils and the like.

A still further object of the invention is to provide a combination of the structures of the tables such that the two tables, when in closed relation, provide closed compartments for the reception of utensils.

Other objects and advantages lie in the details of construction hereinafter set forth and illustrated in the accompanying drawings, wherein:—

Figure 1 is a perspective view of a trailer constructed in accordance with my invention, the forward compartment being shown in the open position and the bed compartment being partially opened;

Figure 2 is a perspective view of the opposite end of the trailer, the dining and work tables being both shown partially withdrawn;

Figure 3 is a vertical longitudinal sectional view through the trailer;

Figure 4 is a longitudinal transverse sectional view taken through the trailer;

Figure 5:
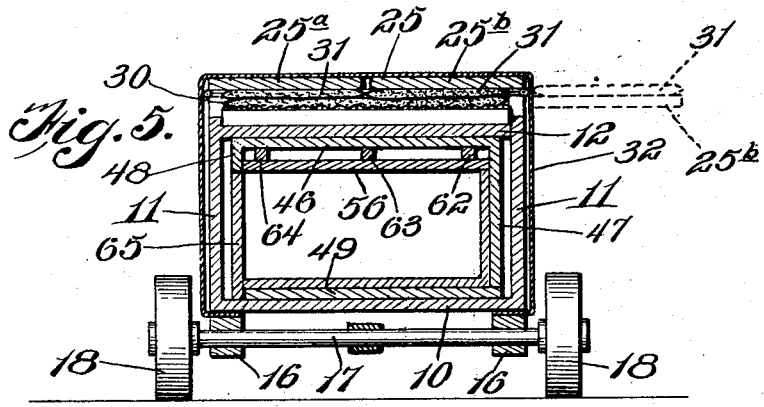
Figure 5 is a section on the line 5—5 of Figure 3.
Figure 6:
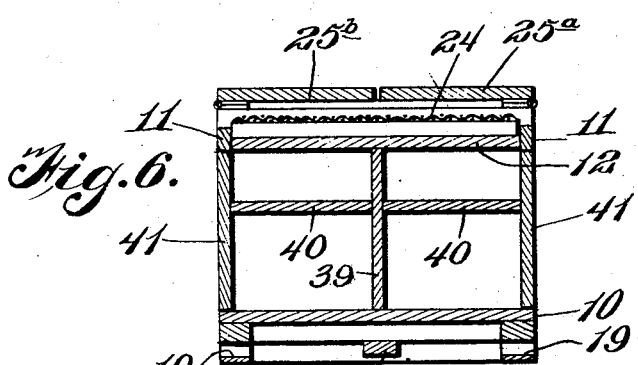
Figure 6 is a section on the line 6—6 of Figure 3.
Figure 7:
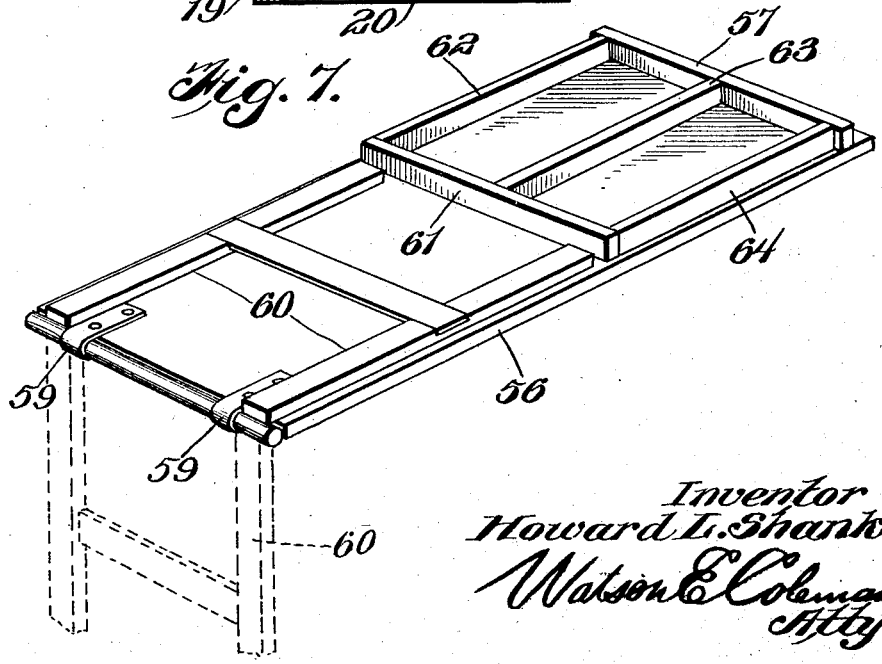
Figure 7 is a perspective of the work table removed, the legs of the table being shown in the supporting position in dotted lines.

Referring now more particularly to the drawings, the trailer comprises a body rectangular in both cross and longitudinal section having a bottom 10, side walls 11, a top 12 and end walls 13 and 14. The side walls 11 and the end walls 13 and 14 project above the top wall 12 a short distance, for a purpose presently to appear.

Supported from the bottom in suitable bearings 16 is an axle 17 arranged centrally of the body and having at its ends supporting wheels 18. These bearings are connected with the body by springs 19 if so desired. The body is formed with a tongue 20 secured at its rear end to the axle 17 intermediate its ends to a bolster 21 carried by the body and having at its forward end a hitch 22 whereby it may be connected with the rear end of an automobile. At its sides, the body is provided with the usual downwardly swinging supporting standards 23 engaging the ground to maintain the body in rigid position when the trailer is detached from the vehicle by which it is drawn. These standards may be, during transportation, swung along the sides of the body and held in such position.

In the space provided between the upper edges of the side and end walls and the upper surface of the top 12, a spring 24 is mounted and to the end walls 13 and 14 at each side of each thereof, a false top 25 is pivoted. This false top is formed in two sections 25$^a$ and 25$^b$ adapted to be swung outwardly beyond the sides of the vehicle and when swung in this position to abut against the upper edges of the outer faces of the side walls, as more clearly shown in Fig. 5 to limit their downward movement. Pivoted to the side walls at each end thereof are supporting brackets 26 which may be swung inwardly against the outer faces of the side walls or outwardly to engage beneath the sections 25$^a$, 25$^b$ of the false top to support the same. The sections of the false top have catches 27 which, when in closed position, engage coacting elements 28 carried by the end walls and when in open position engage similar elements 29 carried by the brackets 26. The false top when in closed position is in spaced relation to the upper surface of the spring so as to provide a space for the storage of bedding which preferably consists of a mattress section 30 of the same width as the body and two mattress sections 31 of one-half this width or of the same width as the top sections 25ª, 25ᵇ. When in the closed position, the trailer is protected by a cover 32 engaging fasteners 33 carried by the body with its lower end and serving, in addition to its function, as a protection to maintain the brackets in position against the sides and prevent movement thereof which would cause unpleasant noises.

The end walls 13 and 14 are open between the side, top and bottom walls and adjacent the end wall 13 but in spaced relation thereto, a partition 34 extends transversely of the body and connects such top, side and bottom walls. A longitudinally extending partition 35 connects the partition 34, top and bottom walls and has its forward edge immediately adjacent the opening of the forward end wall 13. To the forward end wall 13 is pivoted a door 36 combining with the partitions 34 and 35 and top, bottom and side walls to provide a pair of closed compartments 35ª, 35ᵇ through which access is had to the door 36. The door 36 is preferably pivoted at its lower end and this pivotal mounting is preferably such that the door, when in open position, rests upon the tongue 20 to be supported thereby in horizontal position and thus afford a shelf upon which the contents of the compartments may be arranged. A latch 37 is provided for holding the door 36 in closed position.

Paralleling the partition 34 is a similar transversely extending partition 38 connected with the partition 34 centrally by a longitudinally extending partition 39 and at the sides of this partition by horizontally disposed shelves 40. Opposite side walls between the partitions 34, 38 are provided with doors 41 affording access to the compartments 42, 43 formed between the partitions 34, 39. These doors are provided with latches 42ª whereby they may be held in closed position.

The end wall 14 is likewise open between the side, top and bottom walls and has attached to the side walls at the opening, vertically extending bumper strips 44. A frame 45 is slidable through this opening fitting fairly closely between the side walls at the bumper strips and the top and bottom walls. This frame includes a top wall 46, side walls 47 and 48 and a bottom wall 49. The side walls adjacent their rear ends are provided with bumper elements 50 for engagement with the bumper elements 44 to limit the sliding movement of the casing out of the compartment 51 formed between the top, sides and bottom of the body, the end wall 14 and the partition 38. The casing 45 is of substantially the same length as the compartment and has pivoted to its bottom wall 49 at the outer end thereof a door 52 of greater width and depth than the casing and coacting with a latch 53 when the casing is fully housed within the compartment 51 of the body to maintain the casing within this compartment and to seal the compartment. When the casing is slid out of the body, this door may be swung downwardly exposing the outer end of the casing and engaging the ground, as more clearly shown in Fig. 2 to support the outer end of the casing when withdrawn from the compartment. The inner end of the casing being retained within this compartment will be supported from the body of the trailer.

The casing as a whole forms a table, the top 46 forming the table top. This casing is provided with a substantially centrally disposed horizontally extending partition 54 extending throughout the length of the casing and at the forward end of the casing supported by a vertical wall 55. Slidable upon the upper surface of this partition is a work table 56, the upper surface of which is spaced below the lower surface of the top 46 of the casing a considerable distance for a purpose presently to appear. Secured to the work table 56 at its rear end and upon the upper surface thereof is a transversely extending partition 57, the upper surface of which comes into close engagement with the under surface of the top 46, this partition being of the same width as the table top. Secured to the inner faces of the sides 47, 48 of the casing above the work table top 56 and at the outer end of the space between the partition 54 and top 46 are stop blocks 58 against which the ends of this partition engage to limit the movement of the work table out of the compartment within which it is housed.

Pivoted to the forward end of the work table, as at 59, is a leg structure 60 swingable about the pivots thereof to a vertical position where the upper ends of the legs abut the under surface of the table to support the same and the lower ends thereof are arranged in the same plane as the lower end of the door 52 or to a position where the legs lie flatly upon the upper surface of the work table so that the work table may be slid into its compartment. Immediately rearwardly of the legs, the upper surface of the ends of the legs, when in the last named position, a partition 61 paralleling the partition 57 extends transversely of the work table top and is connected with the partition 57 by longitudinally extending partitions 62, 63 and 64, all of the partitions 57, 61, 62, 63 and 64 having their upper surfaces slidably engaging the under surface of the top 46 so that closed compartments are formed between these partitions, the work table top and the under surface of the main table top when the work table is housed within the casing. These compartments are exposed when the work table is withdrawn and may be utilized for the storage of silverware, pans and the like. Between the bottom 49 of the casing and the partition 54, a space is provided in which are mounted drawers 65 opening through the side wall 48 of the casing.

When it is desired to employ tables, the latch 53 is released and the casing 45 drawn outwardly to its fullest extent when the door 52 is swung downwardly until its lower edge comes into engagement with the ground to support the outer end of the casing. This exposes the outer end of the work table which may then be grasped and borne out to its fullest extent and the legs thereof swung downwardly to support the outer end. Attention is directed to the fact that sufficient play may be provided by the structure hereinbefore recited to permit some slight inclination of the tables with relation to one another, thus compensating for any inequalities of the ground upon which the trailer is disposed. When the casing is withdrawn, the drawers 65 are accessible and the contents may be removed. These drawers are ordinarily intended for the reception of such articles as are only employed at meal time, the compartments 35ª, 35ᵇ and 42 and 43 providing ample storage room for remaining articles such as additional supplies of water, fuel and the like and the toilet articles and additional groceries needed by the party.

It will be obvious that the structure hereinbefore set forth is capable of a considerable range of change and modification without in any manner departing from the spirit of my invention and I accordingly do not limit myself to such specific structure except as hereinafter claimed.

I claim:—

1. The combination with a body structure having an opening in one wall thereof, a table slidable into and out of the body through the opening and a member hinged to the outer end of the table along the lower edge thereof and of greater size than the opening, said member being swingable upon the hinges thereof to a vertical position where its free edge abuts the ground to support the outer end of the table when in extended position or to a position where it abuts the body at the sides of the opening when the table is slid within the body, and means for locking said member in the last named position to thereby retain the table within the body.

2. The combination with a body structure having an opening in one wall thereof, a table slidable into and out of the body through the opening and a member hinged to the outer end of the table along the lower edge thereof and of greater size than the opening, said member being swingable upon the hinges thereof to a vertical position where its free edge abuts the ground to support the outer end of the table when in extended position or to a position where it abuts the body at the sides of the opening when the table is slid within the body, and means for locking said member in the last named position to thereby retain the table within the body, said table being in the form of a casing having a compartment opening through one wall thereof, said opening being disclosed when the member is in the first named position.

3. The combination with a body structure having an opening in one wall thereof, a table slidable into and out of the body through the opening and a member hinged to the outer end of the table along the lower edge thereof and of greater size than the opening, said member being swingable upon the hinges thereof to a vertical position where its free edge abuts the ground to support the outer end of the table when in extended position or to a position where it abuts the body at the sides of the opening when the table is slid within the body, means for locking said member in the last named position to thereby retain the table within the body, said table being in the form of a casing having a compartment opening through one wall thereof, said opening being disclosed when the member is in the first named position, and a second table contained within the compartment and withdrawable therefrom through said opening.

4. In a folding table structure for trailers and the like, a main table having the usual top and body formed to provide a compartment beneath the top, a second table arranged within the compartment and slidable therefrom through an opening formed in one end wall of the compartment, a folding leg structure for the last named table and supporting the outer end when extended from the compartment and a swinging leg structure for the first named table positionable to support the end of the first named table having the opening for the compartment or to close the opening of the compartment.

5. The combination with a body structure having an opening in one wall thereof, a table slidable into and out of the body through the opening and a member hinged to the outer end of the table, said member being swingable upon the hinges thereof to a vertical position where its free edge abuts the ground to support the outer end of the table when in extended position or to a position where it closes the opening when the table is slid within the body, and means for locking said member in the last named position to thereby retain the table within the body.

6. The combination with a body structure having an opening in one wall thereof, a table slidable into and out of the body through the opening and a member hinged to the outer end of the table, said member being swingable upon the hinges thereof to a vertical position where its free edge abuts the ground to support the outer end of the table when in extended position or to a position where it abuts the outer end wall of the table and closes the opening of the body when the table is slid within the body, and means for locking said member in the last named position to thereby retain the table within the body, said table being in the form of a casing having a storage compartment opening through the outer end wall thereof, said opening being disclosed when the member is in the first named position.

7. The combination with a body structure having an opening in one wall thereof, a table slidable into and out of the body through the opening and a member hinged to the outer end of the table, said member being swingable upon the hinges thereof to a vertical position where its free edge abuts the ground to support the outer end of the table when in extended position or to a position where it closes the opening when the table is slid within the body, and means for locking said member in the last named position to thereby retain the table within the body, said table including side opening drawers accessible when the table is withdrawn from the body.

8. The combination with a structure having an opening, a table element slidable into and out of the structure through the opening and having its inner end supported by the structure when the table is in withdrawn position, a common element for closing the opening of the structure when the table is housed therein and for supporting the outer end of the table when withdrawn, comprising a member hinged to the outer end of the table and swingable from a position where it extends downwardly to engage the ground and supporting the outer end of the table to a vertical position where it abuts the outer end of the table, said member being of greater size than the outer end of the table and of greater size than said opening and means upon the structure and member for locking the member in the last named position.

9. A table providing a compartment beneath the top thereof, a second table slidable within the compartment and having upstanding partitions thereon combining with the top of the second table to form trays for the reception of articles, the upper surface of said partitions coming into close engagement with the under surface of the top of the first named table when the second named table is housed within the compartment to thereby seal the trays and prevent escape of the contents thereof, said partitions being arranged at the inner end of the top of said second table, a leg structure pivoted to the outer end of the second table and swingable about the pivots thereof from a vertical position where it supports the outer end of the second table to a horizontal position where it rests upon the upper surface of said second table and means pivoted to the first named table for closing said opening.

In testimony whereof I hereunto affix my signature.

HOWARD L. SHANKS.